(12) United States Patent
Ursan et al.

(10) Patent No.: US 6,708,943 B2
(45) Date of Patent: Mar. 23, 2004

(54) CAMERA GIMBAL

(75) Inventors: Natalia E. Ursan, Burnaby (CA); William E. Fenton, Surrey (CA); Dennis K. Ho, Coquitlam (CA)

(73) Assignee: Silent Witness Enterprises Ltd. (CA)

( * ) Notice: Subject to any disclaimer, the term of this patent is extended or adjusted under 35 U.S.C. 154(b) by 59 days.

(21) Appl. No.: 09/809,006

(22) Filed: Mar. 16, 2001

(65) Prior Publication Data

US 2002/0130230 A1 Sep. 19, 2002

(51) Int. Cl.[7] .................................................. F16M 1/00
(52) U.S. Cl. .................. 248/660; 248/187.1; 248/183.2
(58) Field of Search ........................... 248/184.1, 183.2, 248/187.1, 178.1, 284.1, 583, 292.12, 660, 664; 403/93, 97; 74/5.43, 5.46; 396/419, 428, 529; 352/243

(56) References Cited

U.S. PATENT DOCUMENTS

| | | | | |
|---|---|---|---|---|
| 3,115,326 A | * | 12/1963 | Barringer | 248/583 |
| 3,765,631 A | * | 10/1973 | Herbst | 248/204 |
| 4,148,453 A | * | 4/1979 | Brantly | 248/660 |
| 5,181,120 A | | 1/1993 | Hickey et al. | |
| 5,619,195 A | * | 4/1997 | Allen | 341/20 |
| 5,897,223 A | * | 4/1999 | Tritchew et al. | 396/13 |
| 5,954,310 A | * | 9/1999 | Soldo et al. | 248/660 |
| 6,064,430 A | | 5/2000 | Lefkowitz | |
| 6,268,882 B1 | * | 7/2001 | Elberbaum | 348/151 |

* cited by examiner

Primary Examiner—Gwendolyn Baxter
(74) Attorney, Agent, or Firm—Hall, Priddy, Myers & Vande Sande

(57) ABSTRACT

An apparatus for adjustably mounting a camera. The apparatus comprises a base bracket, a ring bracket, a square bracket and a carrier bracket.

20 Claims, 4 Drawing Sheets

CAMERA GIMBAL

FIELD

The present invention is related to a camera positioning apparatus. More specifically, the present invention is related to a camera positioning apparatus having a gimbal assembly.

BACKGROUND OF THE INVENTION

Since the commencement of the use of security cameras, camera users have sought to mount their cameras in various locations and positions. The key to effective use of a security camera is to ensure that the camera is directed at the area to be surveyed. Most often, security cameras are mounted within a static bracket that is fixed in a single position. In other cases, the camera mount is adjustable in only one dimension.

All of these devices suffer from the inability to adjust in at least two dimensions. Therefore, the cameras must be remounted or mounted in a different location should the area to be surveyed change or the line of sight becomes obscured by changing store displays, for example.

Various devices have been developed for mounting cameras yet no single device has combined the qualities of the invention disclosed herein. The camera gimbal described herein is generally smaller and lighter than typical camera mounts. Furthermore, and perhaps more importantly, the camera gimbal of this invention is adjustable in two dimensions and is also rotationally adjustable about the axis of the camera.

SUMMARY OF THE INVENTION

According to the present invention, there is provided a camera gimbal for adjustably mounting a camera. The camera gimbal comprises a base bracket, a ring bracket, a square bracket and a carrier bracket.

The base bracket is mounted to a wall or other surface. The ring bracket is rotationally secured within the base bracket by a plurality of clips. The clips allow the ring bracket to be removable secured within the base bracket. The ring bracket includes two raised pivot posts secured to opposite sides of the ring bracket and extending away from the base bracket. The square bracket is pivotally secured to the pivot posts of the ring bracket. The carrier bracket includes two raised pivot posts secured to opposite sides of the carrier bracket and extending towards the base bracket. A line connecting the pivot posts of the carrier bracket is perpendicular to a line connecting the pivot posts of the ring bracket. The carrier bracket is pivotally secured to the square bracket through the pivot posts.

The pivot posts of the carrier bracket and the ring bracket include a plurality of interleaving ridges. The interleaving ridges allow the carrier bracket and the square bracket to pivot in indexed steps and lock into a particular orientation once positioned.

Other objects and advantages of the invention will become clear from the following detailed description of the preferred embodiment, which is presented by way of illustration only and without limiting the scope of the invention to the details thereof.

BRIEF DESCRIPTION OF THE DRAWINGS

Many objects and advantages of the present invention will be apparent to those of ordinary skill in the art when this specification is read in conjunction with the attached drawings wherein like reference numerals are applied to like elements and wherein.

DETAILED DESCRIPTION

Figure 1:
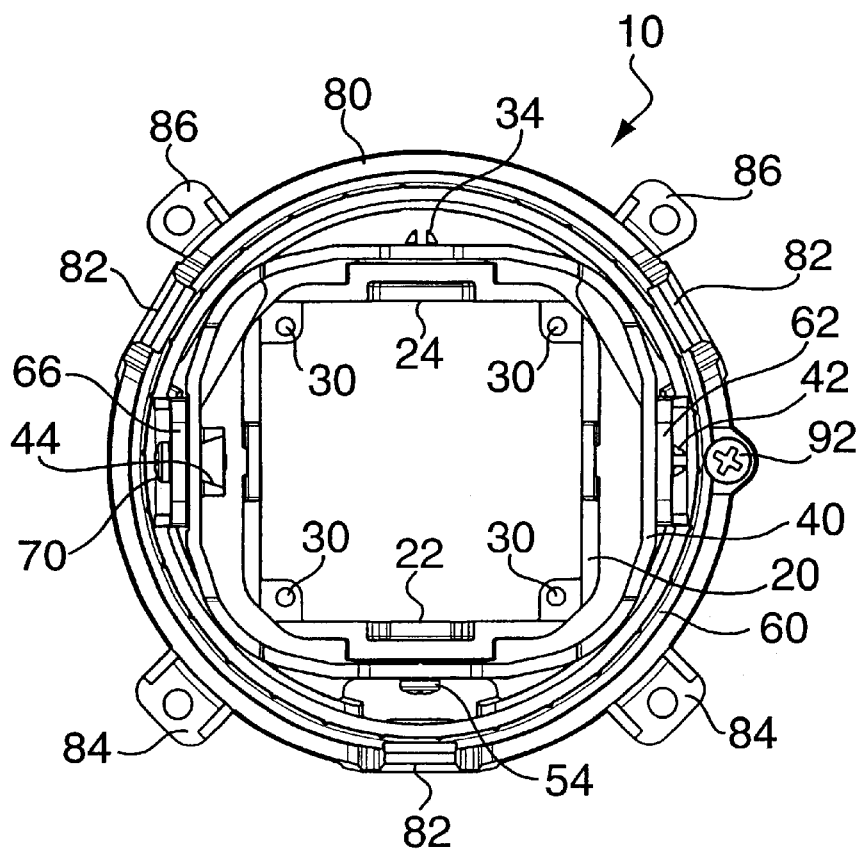
FIG. 1 is a top view of a camera gimbal of this invention.
Figure 2:
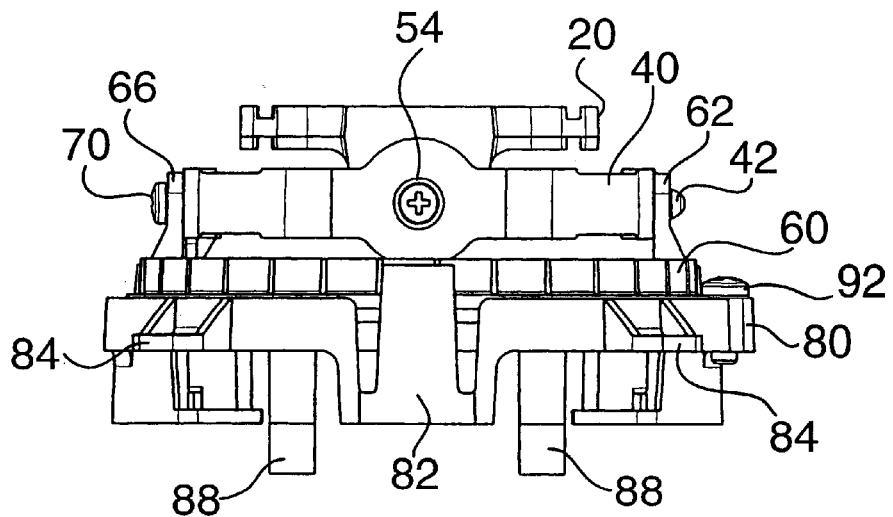
FIG. 2 is a side view of a camera gimbal of this invention.

Referring to FIGS. 1 to 5, a camera gimbal 10 is shown. The camera gimbal 10 comprises a carrier bracket 20, a square bracket 40, a ring bracket 60 and a base bracket 80.

The base bracket 80 includes mounting posts 88 and mounting tabs 84 and 86. The mounting posts 88 and the mounting tabs 84 and 86 may be used individually or in combination to mount the base bracket in the desired location. The base bracket further includes a channel 90 to accept the ring bracket 60. The ring bracket 60 is removably secured within the channel 90 by a plurality of clips 82. The ring bracket 60 rotates 360 degrees within the channel 90 of the base bracket 80.

The base bracket 80 may also include an optional screw 92 to lock the ring bracket into place and prevent it from rotating once positioned.

The ring bracket 60 includes two pivot posts 62 and 66. Pivot posts 62 and 66 have apertures 64 and 74 respectively, to allow the square bracket 40 to be pivotally secured to the pivot posts 62 and 66. A plurality of ridges 68 on the inside surface of the pivot post 66 interleave with a plurality of ridges 56 on the outside surface of the square bracket 40. The interleaving of the ridges 68 and 56, allows the square bracket to pivot in indexed steps and lock into a particular orientation once positioned. The ring bracket 60 rotates in the direction indicated by arrow 72.

The square bracket 40 includes a projection 42 and a post 45 having an aperture 44 to secure the square bracket within the ring bracket. To secure the square bracket 40 to the ring bracket 60, the projection 42 of the square bracket 40 is inserted into the aperture 64 of the ring bracket 60, and the aperture 44 of the square bracket 40 is aligned with the aperture 74 and a screw 70 passes through apertures 74 and 44 and is secured within the post 45, thereby pivotally securing the square bracket 40 to the ring bracket 60. Preferably, aperture 44 is threaded to receive and secure the screw 70. Square bracket 40 pivots in the directions as indicated by arrow 52 around a line formed by joining aperture 44 and projection 42 of the square bracket.

As discussed previously, a plurality of ridges 56 oriented about the aperture 44 interleave with the ridges 68 of the ring bracket 60 allowing the square bracket 40 to pivot in indexed steps and lock into a particular orientation once positioned.

The square bracket 40 further includes apertures 46 and 48. Apertures 46 and 48 are arranged such that a line formed by joining apertures 46 and 48 is perpendicular to a line formed by joining projection 42 and aperture 44. A plurality of ridges 50 are on the inside surface of the square bracket 40 oriented about the aperture 48.

The carrier bracket 20 includes pivot posts 24 and 22. Pivot post 22 includes ridges 26 and aperture 28. Pivot post 24 includes a projection 34. To secure the carrier bracket 20 to the square bracket 40, the projection 34 of carrier bracket 20 is inserted into aperture 46 of the square bracket, and the aperture 28 of the carrier bracket is aligned with the aperture 48 of the square bracket a screw 54 passes through apertures 48 and 28 and is secured within the aperture 28, thereby pivotally securing the carrier bracket 20 to the square bracket 40. In this way, the carrier bracket pivots in the direction indicated by arrow 32. Preferably, aperture 28 is threaded to receive and secure the screw 54. The interleaving of the ridges 50 of the square bracket 40 and the ridges 26 of the carrier bracket 20 allowing the carrier bracket 20 to pivot in indexed steps and lock into a particular orientation once positioned.

Figure 3:
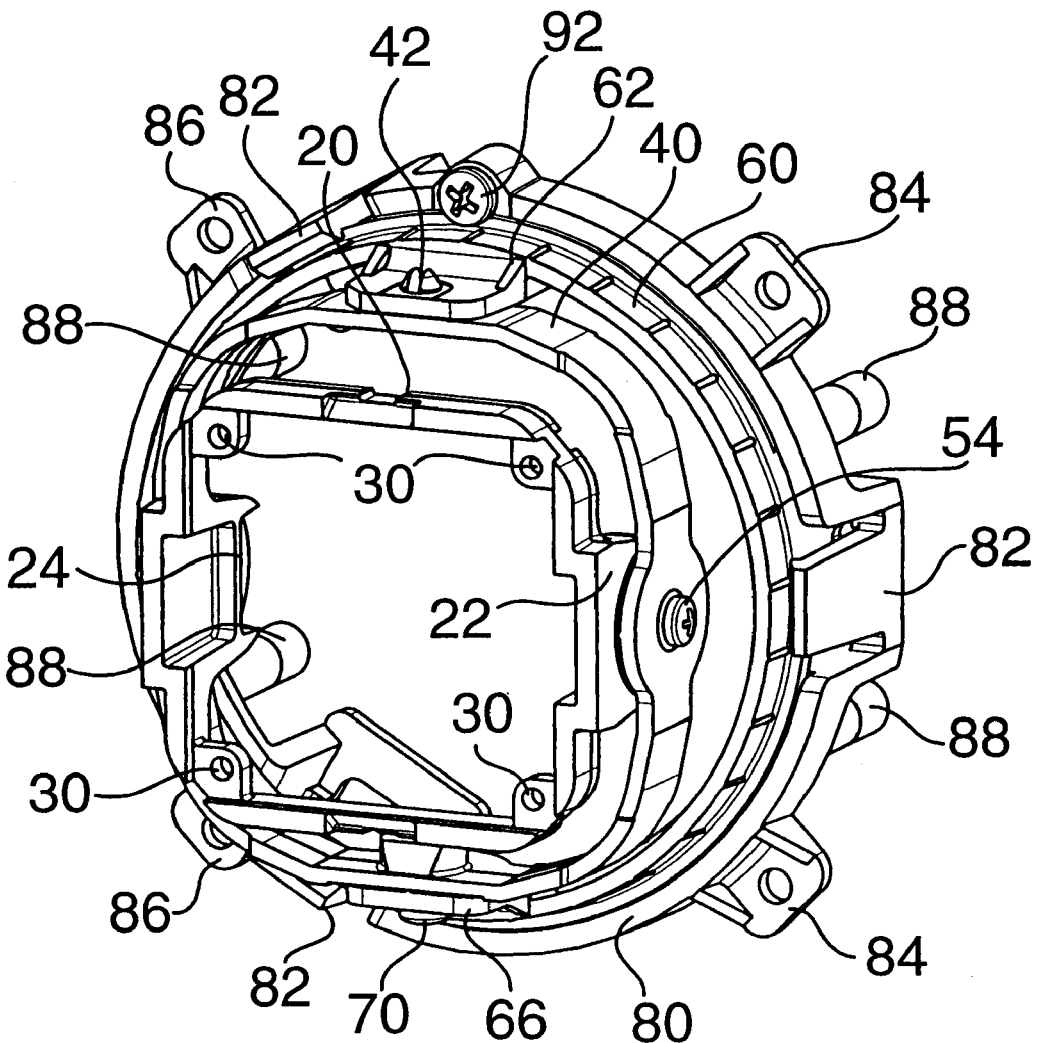
FIG. 3 is a perspective view of a camera gimbal of this invention.
Figure 4:
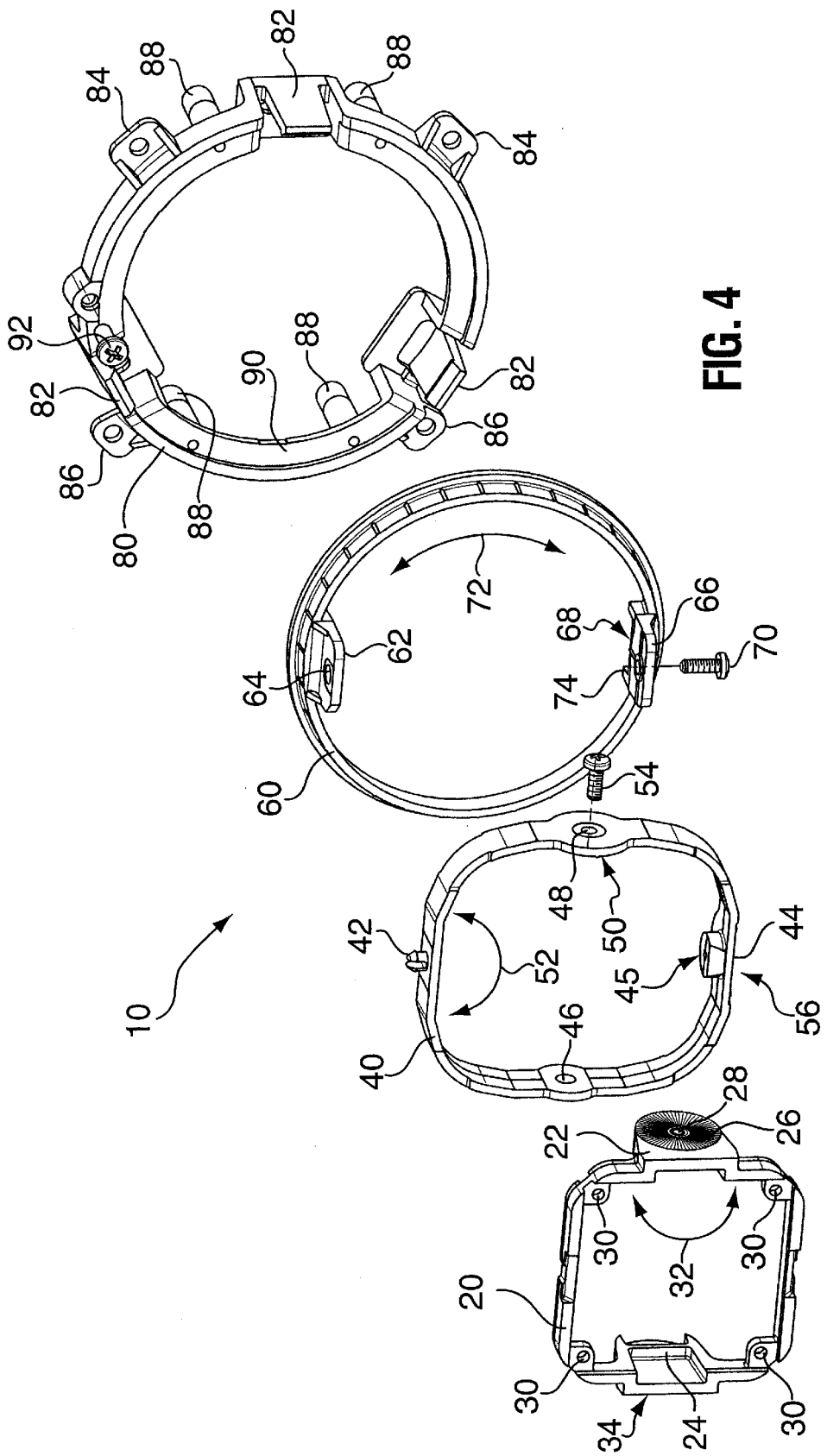
FIG. 4 is an exploded perspective view of a camera gimbal of this invention.
Figure 5:
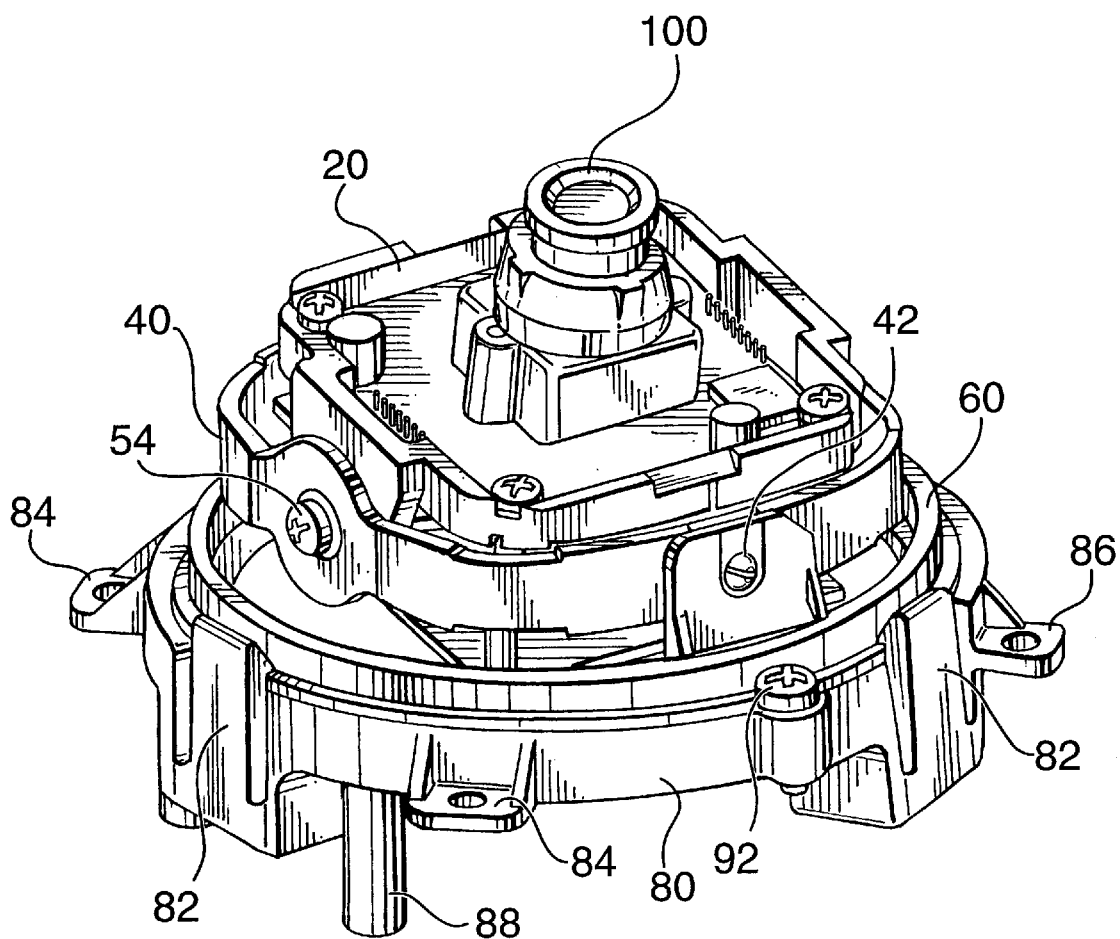
FIG. 5 is a perspective of a camera gimbal of this invention housing a camera.

Referring to FIGS. 3, 4 and 5, the carrier bracket 20 further includes mounting tabs 30 to secure a camera 100 to the interior of the carrier bracket.

The combination of the four brackets permits a camera 100 to be positioned freely about three orthogonal axes, namely roll, yaw and pitch. In particular, the carrier bracket 20 is adjustable about the pitch axis, the square bracket 40 is adjustable about the yaw axis and the ring bracket 60 is adjustable about the roll axis.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A camera positioning apparatus comprising:
   (a) a mounting bracket;
   (b) a gimbal bracket assembly having
      i) a ring bracket, rotationally secured to said mounting bracket and operative to rotate about a roll axis;
      ii) a square bracket, pivotally secured to said ring bracket and operative to pivot about a yaw axis; and
      iii) a carrier bracket, pivotally secured to said square bracket and operative to pivot about a pitch axis; and
   (c) a plurality of locking mechanisms, each of said locking mechanisms operative to lock said gimbal bracket assembly about a respective one of said axes.

2. The camera positioning apparatus according to claim 1, wherein a first of said locking mechanisms locks said carrier bracket relative to said gimbal bracket assembly and a second of said locking mechanisms locks said square bracket relative to said gimbal bracket assembly.

3. The camera positioning apparatus according to claim 2, wherein said first and second locking mechanisms include interleaving of ridges on adjacent bracket surfaces.

4. The camera positioning apparatus according to claim 1, wherein said mounting bracket includes a plurality of clips to removably and rotationally secure said ring bracket to said mounting bracket.

5. The camera positioning apparatus according to claim 1, wherein a camera is secured to said gimbal bracket assembly.

6. The camera positioning apparatus according to claim 1, wherein said ring bracket is locked relative to said mounting bracket by a screw.

7. A camera positioning apparatus comprising:
   (a) a mounting bracket;
   (b) a gimbal bracket assembly having three orthogonal axes, wherein said first axis is roll, said second axis is yaw and said third axis is pitch and wherein said gimbal bracket assembly is secured to said mounting bracket; and
   (c) a plurality of locking mechanisms, each of said locking mechanisms operative to lock said gimbal bracket assembly about a respective one of said three orthogonal axes,
   wherein said gimbal bracket assembly has a range of motion of at least approximately 360° about each of said three orthogonal axes.

8. The camera positioning apparatus according to claim 7, wherein said gimbal bracket assembly comprises:
   (a) a ring bracket, rotationally secured to said mounting bracket and operative to rotate about the first axis;
   (b) a square bracket, pivotally secured to said ring bracket and operative to pivot about the second axis; and
   (c) a carrier bracket, pivotally secured to said square bracket and operative to pivot about the third axis.

9. The camera positioning apparatus according to claim 8, wherein a first of said locking mechanisms locks said carrier bracket relative to said gimbal bracket assembly and a second of said locking mechanisms locks said square bracket relative to said gimbal bracket assembly.

10. The camera positioning apparatus according to claim 9, wherein said first and second locking mechanisms include interleaving of ridges on adjacent bracket surfaces.

11. The camera positioning apparatus according to claim 8, wherein said mounting bracket includes a plurality of clips to removably and rotationally secure said ring bracket to said mounting bracket.

12. The camera positioning apparatus according to claim 8, wherein said ring bracket is locked relative to said mounting bracket by a screw.

13. The camera positioning apparatus according to claim 7, wherein a camera is secured to said gimbal bracket assembly.

14. A camera positioning apparatus comprising:
   (a) a mounting bracket;
   (b) a gimbal bracket assembly having three orthogonal axes, wherein said first axis is roll, said second axis is yaw and said third axis is pitch and wherein said gimbal bracket assembly is secured to said mounting bracket; and
   (c) a plurality of locking mechanisms, each of said locking mechanisms operative to lock said gimbal bracket assembly about a respective one of said three orthogonal axes,
   wherein said locking mechanism operative to lock said gimbal bracket assembly about said first axis is on said first axis; and
   wherein said locking mechanism operative to lock said gimbal bracket assembly about said third axis is on said third axis.

15. The camera positioning apparatus according to claim 14, wherein said gimbal bracket assembly comprises:
   (a) a ring bracket, rotationally secured to said mounting bracket and operative to rotate about the first axis;
   (b) a square bracket, pivotally secured to said ring bracket and operative to pivot about the second axis; and
   (c) a carrier bracket, pivotally secured to said square bracket and operative to pivot about the third axis.

16. The camera positioning apparatus according to claim 15, wherein a first of said locking mechanisms locks said carrier bracket relative to said gimbal bracket assembly and a second of said locking mechanisms locks said square bracket relative to said gimbal bracket assembly.

17. The camera positioning apparatus according to claim 16, wherein said first and second locking mechanisms include interleaving of ridges on adjacent bracket surfaces.

18. The camera positioning apparatus according to claim 15, wherein said mounting bracket includes a plurality of clips to removably and rotationally secure said ring bracket to said mounting bracket.

19. The camera positioning apparatus according to claim 15, wherein said ring bracket is locked relative to said mounting bracket by a screw.

20. The camera positioning apparatus according to claim 14, wherein a camera is secured to said gimbal bracket assembly.

* * * * *